United States Patent
Sichevoy et al.

(10) Patent No.: US 11,438,306 B2
(45) Date of Patent: Sep. 6, 2022

(54) SYSTEM AND METHOD OF CONNECTING A DNS SECURE RESOLUTION PROTOCOL

(71) Applicant: AO Kaspersky Lab, Moscow (RU)

(72) Inventors: Andrey V. Sichevoy, Moscow (RU); Denis V. Rodionov, Moscow (RU); Alexander N. Makarov, Moscow (RU)

(73) Assignee: AO Kaspersky Lab, Moscow (RU)

( * ) Notice: Subject to any disclaimer, the term of this patent is extended or adjusted under 35 U.S.C. 154(b) by 283 days.

(21) Appl. No.: 16/450,276

(22) Filed: Jun. 24, 2019

(65) Prior Publication Data

US 2020/0213266 A1 Jul. 2, 2020

(30) Foreign Application Priority Data

Dec. 28, 2018 (RU) .......................... RU2018147228

(51) Int. Cl.
*H04L 61/4511* (2022.01)
*H04L 61/103* (2022.01)
*H04L 9/40* (2022.01)

(52) U.S. Cl.
CPC ........ *H04L 61/4511* (2022.05); *H04L 61/103* (2013.01); *H04L 63/0428* (2013.01); *H04L 63/20* (2013.01)

(58) Field of Classification Search
None
See application file for complete search history.

(56) References Cited

U.S. PATENT DOCUMENTS

| 6,961,783 | B1 | 11/2005 | Cook et al. | |
| 9,083,727 | B1 * | 7/2015 | Stamos | H04L 41/0893 |
| 2007/0255848 | A1 | 1/2007 | Sewall et al. | |
| 2009/0112814 | A1 | 4/2009 | Statia et al. | |
| 2010/0332680 | A1 * | 12/2010 | Anderson | H04L 61/4511 709/245 |
| 2011/0106919 | A1 * | 5/2011 | Mazur | H04L 61/4511 709/245 |
| 2012/0096166 | A1 * | 4/2012 | Devarapalli | H04L 67/1002 709/226 |
| 2014/0280305 | A1 * | 9/2014 | James | H04L 61/1511 707/769 |

(Continued)

FOREIGN PATENT DOCUMENTS

WO 20180186718 A1 10/2018

OTHER PUBLICATIONS

J.H.C. van Heugten "Privacy Analysis of DNS Resolver Solutions", Master of System Network Engineering University of Amsterdam, Aug. 3, 2018, pp. 1-17.

*Primary Examiner* — Kevin T Bates
*Assistant Examiner* — Emad Siddiqi
(74) *Attorney, Agent, or Firm* — ArentFox Schiff LLP; Michael Fainberg (57) ABSTRACT

Disclosed herein are systems and methods for connecting a Domain Name System (DNS) secure resolution protocol. In one aspect, an exemplary method comprises, by a protection module, determining a DNS query from a client, determining a fulfillment of at least one condition for connecting the DNS secure resolution protocol, wherein the at least one condition is obtained from a database, and connecting the DNS secure resolution protocol for the client when the at least one condition for connecting the DNS secure resolution protocol is fulfilled.

17 Claims, 3 Drawing Sheets

(56) References Cited

U.S. PATENT DOCUMENTS

2015/0319097 A1* 11/2015 Hyatt ................. H04L 12/6418
  709/224
2016/0050178 A1*  2/2016 Frydman ............ H04L 61/4511
  709/219
2019/0332774 A1* 10/2019 Nix ...................... H04W 12/06

* cited by examiner

SYSTEM AND METHOD OF CONNECTING A DNS SECURE RESOLUTION PROTOCOL

CROSS REFERENCE TO RELATED APPLICATIONS

The present application claims priority to Russian Patent Application No. 2018147228, filed on Dec. 28, 2018, the entire content of which is incorporated herein by reference.

FIELD OF TECHNOLOGY

The present disclosure relates to the field of computer security, more specifically, to systems and method of resolving Internet Protocol (IP) addresses from domain names.

BACKGROUND

The Domain Name System (DNS) is a distributed system for obtaining information about domain names. When a user requests access to a site, a resolver (a local agent application obtaining information associated with the domain name) sends a DNS query to obtain the IP address corresponding to the domain name of the site. For the sending of the DNS queries, the UDP or TCP protocol is typically used without encryption. Therefore, such a system is vulnerable to tracking and to spoofing, i.e., confidentiality and security may be violated during the sending of the DNS queries and the receiving of response from a DNS server. Any DNS server or router on the way to this DNS server can determine the IP address of the user having requested access to a site. Furthermore, the resolver itself can gather information about users and the sites visited by them. Spoofing involves the possibility of changing the response, for example, a hacker can dispatch the IP address of a phishing site containing a malicious script or application instead of the actual IP address of the site.

For a partial solution of the mentioned problems, the link between the DNS resolvers and the authoritative DNS servers may have additional protection. For example, means of verifying the integrity of the data transmitted (DNS Security Extensions, DNSSEC) may be provided. Recently, DNS secure resolution protocols have been developed for heightening confidentiality and security, such as: DNS over HTTPS (DNS Queries over HTTPS, DoH, as published by developers.google.com/speed/public-dns/docs/dns-over-https or tools.etf.org), DNS over TLS, cf. IETF RFC 7858, as published by tools.ietf.org, and RFC 8310, as published by tools.ietf.org). DNS secure resolution protocols employ the resolution DNSSEC over encrypted HTTPS or TLS protocols. However, these protocols have not become widely used due to other problems they introduce. Despite the aforementioned benefits, their use introduces a number of limitations which may lower the availability of the network connection. Lowering of the availability of a network connection may appear, for example, as a lack of network access or a lowering of the data transfer rate through the network. In addition, many network applications do not support DNS secure resolution protocols, and the providers may provide their own DNS servers to be used, having information about the matching up of the domain names with the IP addresses of the network resources.

Hence, there is a need to enhance the confidentiality and security of a network connection when using the domain name system without affecting the availability of the network connection.

SUMMARY

Aspects of the disclosure relate to the field of network security, more specifically to systems and methods for resolving IP addresses from domain names. For example, the confidentiality and security of the network connection may be heightened when providing access of a network connection using the domain name system by connecting a DNS secure resolution protocol, with fulfillment of the condition for connecting a DNS secure resolution protocol.

In one exemplary aspect, a method for connecting a Domain Name System (DNS) secure resolution protocol is implemented in a computer comprising a hardware processor, the method comprising: by a protection module, determining a DNS query from a client, determining a fulfillment of at least one condition for connecting the DNS secure resolution protocol, wherein the at least one condition is obtained from a database, and connecting the DNS secure resolution protocol for the client when the at least one condition for connecting the DNS secure resolution protocol is fulfilled.

According to one aspect of the disclosure, a system is provided for connecting a Domain Name System (DNS) secure resolution protocol, the system comprising a hardware processor configured to: by a protection module, determine a DNS query from a client, determine a fulfillment of at least one condition for connecting the DNS secure resolution protocol, wherein the at least one condition is obtained from a database, and connect the DNS secure resolution protocol for the client when the at least one condition for connecting the DNS secure resolution protocol is fulfilled.

In one exemplary aspect, a non-transitory computer-readable medium is provided storing a set of instructions thereon for connecting a Domain Name System (DNS) secure resolution protocol, wherein the set of instructions comprises instructions for: by a protection module, determining a DNS query from a client, determining a fulfillment of at least one condition for connecting the DNS secure resolution protocol, wherein the at least one condition is obtained from a database, and connecting the DNS secure resolution protocol for the client when the at least one condition for connecting the DNS secure resolution protocol is fulfilled.

In one aspect, the method further comprises: determining whether an availability of the network connection decreases after the connection of the DNS secure resolution protocol; and connecting to a different DNS secure resolution protocol when the availability of the network connection decreases after the connection of the DNS secure resolution protocol.

In one aspect, the condition for connecting a DNS secure resolution protocol comprises at least one of: a lowering of a mean data transfer rate in a computer network; connecting to a public access point; obtaining access to one or more corporate resources in the computer network; obtaining access to resources from a list of protected resources; and an address of a requested resource not being obtained using a DNS protocol.

In one aspect, when the fulfilled condition for connecting the DNS secure resolution protocol comprises the lowering of the mean data transfer rate in the computer network, the method further comprises lowering a number of DNS queries being transmitted by at least one client.

In one aspect, the lowering of the number of DNS queries includes installing a single encrypted connection.

In one aspect, when the fulfilled condition for connecting the DNS secure resolution protocol comprises the connecting to the public access network, the method further comprises determining the connection to the public access network by: identifying a heuristic signature of a known name of the access point; or identifying the public access point from a list of public Service Set Identifiers (SSIDs).

In one aspect, the at least one condition for connecting the DNS secure resolution protocol is modified, disabled or enabled by an administrator or a user of the database from which the at least one condition is obtained.

The connecting of the DNS secure resolution protocol in accordance with the teachings of the present disclosure improves data security. The improvement is achieved by: determining a DNS query from a client, determining a fulfillment of at least one condition for connecting the DNS secure resolution protocol, wherein the at least one condition is obtained from a database, and connecting the DNS secure resolution protocol for the client when the at least one condition for connecting the DNS secure resolution protocol is fulfilled.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and a computer program for connecting a DNS secure resolution protocol. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

Figure 1:
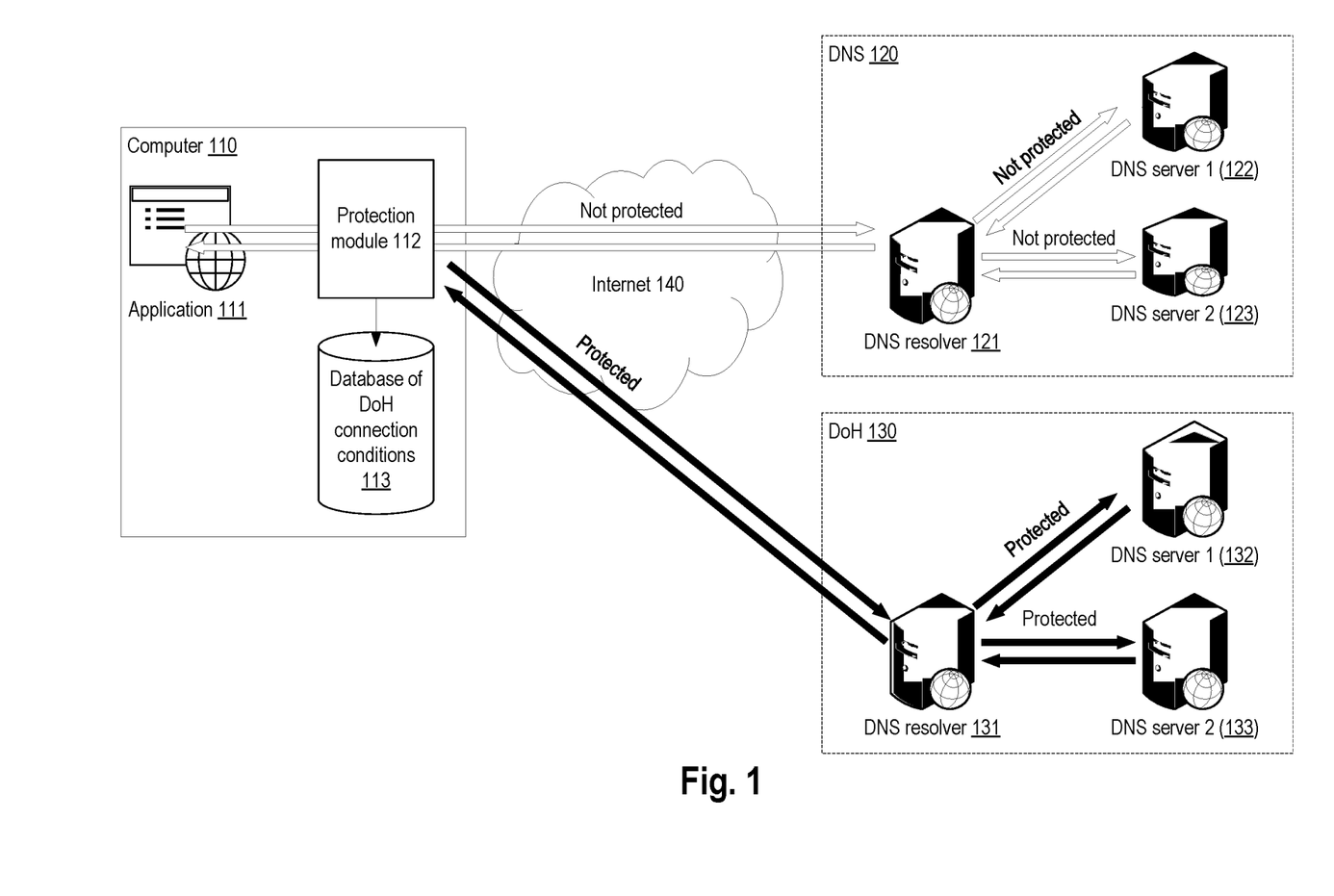
FIG. 1 is a block diagram illustrating an exemplary system for connecting a DNS secure resolution protocol in accordance with aspects of the present disclosure.

FIG. 1 is a block diagram illustrating an exemplary system 100 for connecting a DNS secure resolution protocol in accordance with aspects of the present disclosure.

As an illustrative example, the following text and figures shall describe the DNS secure resolution protocol DNS over HTTPS (DoH), which may be more preferable than, for example, the protocol DNS over TLS, because the providers can block ports not belonging to the commonly used ports for servicing the HTTP protocol. At the same time, the standard ports of the HTTP (80) and HTTPS (443) protocols are almost always open. However, it should be understood that the proposed invention can be used with any other DNS secure resolution protocols, in particular DNS over HTTPS and DNS over TLS.

On a computer 110 there is installed a client—an application 111 (such as a web browser), which provides access to the Internet 140. In the present application, the computer 110 is understood to be any computing device, especially a personal computer, notebook, smartphone, tablet, router, data storage system, or server.

When using the DNS protocol 120, upon the user entering the web address of a site in the browser, the domain name of the site on the Internet is extracted therefrom (for example, www.kaspersky.com), and the application 111 independently or through a system resolver application on the computer 110 sends a DNS query to a DNS resolver 121 to obtain the IP address of the site so entered.

In turn, the DNS resolver 121 performs the resolving of the IP address, in the present instance, by accessing DNS servers 122-123 and finally returns the IP address of the site to the application 111. Then, using the IP address, the application 111 receives the content of the site via the HTTP or HTTPS protocol.

A protection module 112 is installed on the computer 110 and is designed to determine or intercept the DNS query from the client, i.e., the application 111. The dispatching of the DNS query may be determined by the protection module 112, said DNS query utilizing a network driver, when dispatching a UDP/TCP packet, containing the signature of the DNS protocol, and/or when dispatching said packet to a port 53, which is used in the DNS protocol. The dispatching of the DNS query may also be determined by installing an interceptor of system/WinAPI calls for resolution of IP addresses from domain names. For example, such system calls in the Windows operating system (OS) are: DnsQuery_A( ), DnsQuery)W( ), getaddrinfo( ), while in Linux it is getaddrinfo( ).

After determining the dispatching of the DNS query, the protection module 112 determines whether a condition is fulfilled for connecting a DNS secure resolution protocol, for example, from a conditions database 113 (such as a database or list saved on a disk, etc.), which may be generated in advance, for example, by the manufacturer of the protection module 112.

In event of fulfilling the condition for connecting a DNS secure resolution protocol, the protection module 112 connects the DNS secure resolution protocol for the client. As a result, all the DNS queries of the application 111 will be sent to a DNS resolver 131 by the DNS secure resolution protocol, such as DoH 130.

In turn, the DNS resolver 131 performs the resolution of the IP address, in the present instance, by accessing DNS servers 132-133, and finally returns the IP address of the requested resource to the application 111.

The connecting of the DNS secure resolution protocol (such as DoH) may be done by establishing a new protected connection (for example by the HTTPS protocol) from one of: the network driver at the level of the OS kernel, or the protection module 112 at the level of the OS user space. The protected connection, in this case, will be established between the application 111 and the DNS resolver 131, and also between the DNS resolver 131 and the DNS servers 132-133.

In one aspect, if after the connecting of the DNS secure resolution protocol (for example, the protocol DNS over TLS was connected) the availability of the network connection decreased (for example, after the provider has blocked the ports not belonging to the commonly used ports for servicing the HTTP protocol), then the protection module 112 is, in this case, used to connect a different DNS secure resolution protocol (such as DNS over HTTPS, DoH). The lowering of the availability of the network connection may appear, for example, as a lack of network access or a lowering of the data transfer rate through the network.

In one aspect, the condition for connecting a DNS secure resolution protocol is at least one of the following:
- lowering of the mean data transfer rate in the computer network;
- connecting to public access points;
- obtaining access, e.g., by the application 111, to corporate resources in a computer network;
- obtaining access to resources from a list of protected resources, e.g., protected by the protection module 112 (not shown in the figure); and
- the address of the requested resource not being obtained with the use of the DNS protocol.

When the condition for connecting the DNS secure resolution protocol comprises lowering of the mean data transfer rate in the computer network, the number of DNS queries being transmitted by at least one application 111 may be lowered by the installing of a single encrypted connection (for example, an HTTPS connection when connecting the DoH protocol). Moreover, the protection module 112 will be used to offer protection to the user against tracking on the part of the network provider.

The lowering of the mean data transfer rate in the computer network can be determined, for example, by a network driver, which will determine the lowering of the number of data packets being transmitted. Moreover, this condition can be determined during switching of the network connection, for example from Wi-Fi to mobile Internet—in this case, the connection begins to be considered as "limited" by the operating system.

When the condition for connecting the DNS secure resolution protocol comprises the connecting to public access points, the public access points are contained in the database of the protection module 112 and labeled as being unsecure. Connecting to such access points carries substantial risks to the user of the computer 110, since they may be used by hackers.

The connecting to public access points may be determined, for example, by heuristic signature on the basis of known names of the access points (which include, for example, the words: airport, cafe, etc.), from lists of public SSIDs, when connecting to Wi-Fi access points without authentication.

When the condition for connecting the DNS secure resolution protocol comprises obtaining access by the application 111 to corporate resources in a computer network, access not trackable by the provider can be provided to corporate resources when a VPN connection is not possible (for example, the GRE/PPTP protocol is blocked).

The condition for obtaining access to resources from a list of resources protected by the protection module 112 (not shown in the figure) may occur, for example, if the user opens web banking or makes purchases on the Internet.

The condition for the address of the requested resource not being obtained with the use of the DNS protocol may occur, in certain cases, when the IP address of the requested site could not be resolved with the use of the DNS protocol, the protection module 112 may connect a DNS secure resolution protocol.

The condition for the address of requested resource not being obtained with the use of the DNS protocol can be determined when the domain zone of the requested resource is not standard (for example, ".kaspersky" is not subject to the Internet address space administration (IANA).

In one aspect, the conditions from the database 113 of conditions for connecting a DNS secure resolution protocol can be updated with the use of a remote server of the manufacturer of the protection module 112. For example, the list of resources protected by the protection module 112 can be updated.

In another aspect, the computer user or administrator can update or set up the mentioned conditions from the conditions database 113. For example, the list of protected resources may be changed, or some of the conditions may be disabled, such as the condition of obtaining access to corporate resources in the computer network in the event that the computer 110 is the user's home computer.

Figure 2:
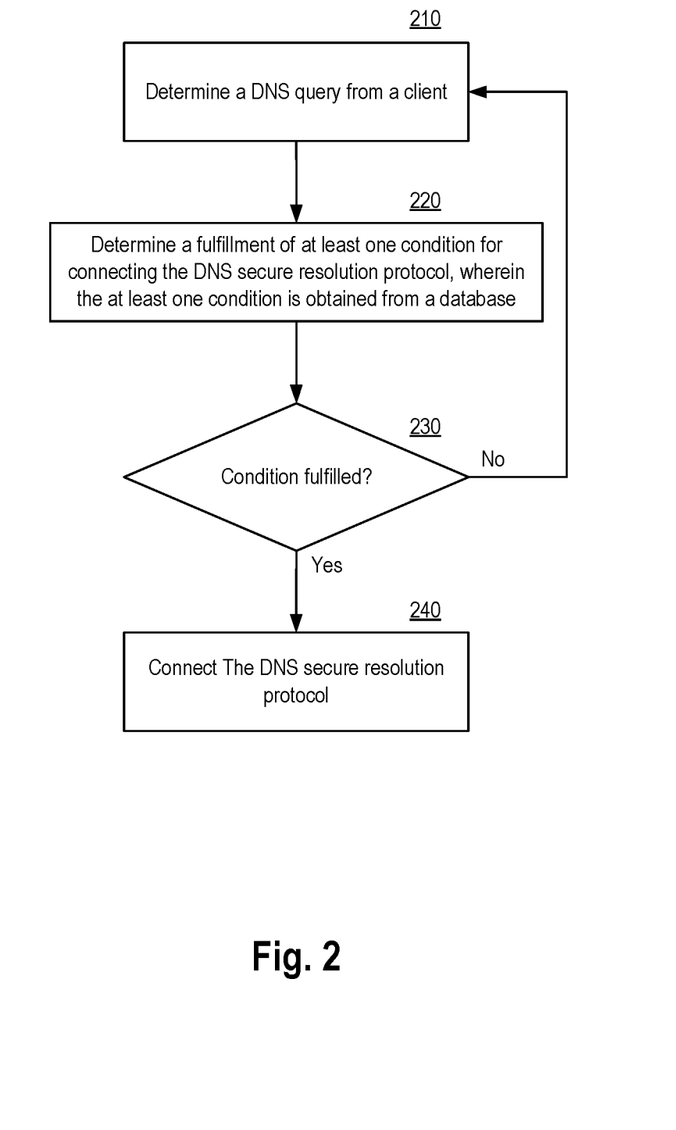
FIG. 2 is a flow diagram illustrating an exemplary method for connecting a DNS secure resolution protocol.

FIG. 2 is a flow diagram illustrating an exemplary method 200 for connecting a Domain Name System (DNS) secure resolution protocol.

In step 210, method 200, by the protection module 112, determines a DNS query from a client (i.e., the application 111).

In step 220, method 200, by the protection module 112, determines a fulfillment of at least one condition for connecting the DNS secure resolution protocol. In one aspect, the at least one condition is obtained from a database, e.g., the database 113 containing conditions for connecting the DNS secure resolution protocol.

In step 230, the method 200 determines whether the at least one condition for connecting the DNS secure resolution protocol is fulfilled. If the at least one condition for connecting the DNS secure resolution protocol is fulfilled, the method proceeds to step 240. Otherwise, the method proceeds to step 210 to continue determination of DNS queries.

In step 240, the method connects the DNS secure resolution protocol for the client.

In one aspect, the method further comprises: determining whether an availability of the network connection decreases after the connection of the DNS secure resolution protocol (for example, after the protocol DNS over TLS was connected). For example, the availability after the connection of the DNS secure resolution protocol may be compared to the availability prior to the connection.

In one aspect, if the availability of the network connection decreases (for example, after the provider has blocked the ports not belonging to the commonly used ports for servicing the HTTP protocol) after the connection of the DNS secure resolution protocol (for example, after the protocol DNS over TLS was connected), the method further comprises connecting to a different DNS secure resolution protocol. For example, in this case, the protection module 112 is used to connect a different DNS secure resolution protocol (such as DNS over HTTPS, DoH).

In one aspect, the condition for connecting a DNS secure resolution protocol comprises at least one of:
- a lowering of a mean data transfer rate in a computer network;
- connecting to a public access point;
- obtaining access, e.g., by the application 111, to one or more corporate resources in the computer network;
- obtaining access to resources from a list of protected resources, e.g., protected by the protection module 112 (not shown in the figure); and
- an address of a requested resource not being obtained with using a DNS protocol.

In one aspect, when the fulfilled condition for connecting the DNS secure resolution protocol comprises the lowering of the mean data transfer rate in the computer network, the method further comprises: lowering a number of DNS queries being transmitted by at least one client. In one aspect, the lowering of the number of DNS queries includes installing a single encrypted connection. In other words, when the lowering of the mean data transfer rate in the computer network occurs, the number of DNS queries being transmitted by at least one application 111 may be lowered by the installing of a single encrypted connection (for example, an HTTPS connection when connecting the DoH protocol). Moreover, the protection module 112 will be used to offer protection to the user against tracking on the part of the network provider.

The condition in which the lowering of the mean data transfer rate occurs can be determined, for example, by a network driver, which will determine the lowering of the number of data packets being transmitted. Moreover, this condition can be determined during switching of the network connection, for example from Wi-Fi to mobile Internet—in this case, the connection begins to be considered as "limited" by the operating system.

The condition for connection to public access points occurs when the user has connected to public access points which are contained in the database of the protection module 112 and labeled as being unsecure. Connecting to such access points carries substantial risks to the user of the computer 110, since they may be used by hackers. The condition of connecting to the public access points is determined, for example, by heuristic signature on the basis of known names of the access points (which include, for example, the words: airport, cafe, etc.), from lists of public SSIDs, when connecting to Wi-Fi access points without authentication.

In one aspect, when the fulfilled condition for connecting the DNS secure resolution protocol comprises the connecting to the public access network, determining the connection to the public access point by: identifying a heuristic signature of a known names of the access point, or identifying the public access point from a list of public Service Set Identifiers (SSIDs).

When the condition for obtaining access by the application 111 to corporate resources in a computer network occurs, access not trackable by the provider can be provided to corporate resources when a VPN connection is not possible (for example, the GRE/PPTP protocol is blocked).

When the condition for obtaining access to resources from a list of resources protected by the protection module 112 (not shown in the figure) occurs, for example, if the user opens web banking or makes purchases on the Internet.

When the address of the requested resource was not obtained with the use of the DNS protocol, in certain cases, when the IP address of the requested site could not be resolved with the use of the DNS protocol, the protection module 112 may connect a DNS secure resolution protocol. These conditions can be determined when the domain zone of the requested resource is not standard (for example, ".kaspersky" is not subject to the Internet address space administration (IANA).

In one aspect, the conditions for connecting a DNS secure resolution protocol can be updated with the use of a remote server of the manufacturer of the protection module 112. For example, the list of resources protected by the protection module 112 can be updated.

In another aspect, the computer user or administrator can update or set up the mentioned conditions from the conditions database 113. For example, the list of protected resources may be changed, or some of the conditions may be disabled, such as the condition of obtaining access to corporate resources in the computer network in the event that the computer 110 is the user's home computer. In one aspect, the at least one condition for connecting the DNS secure resolution protocol is modified, disabled or enabled by an administrator or a user of the database from which the at least one condition is obtained.

Thus, the method of the present disclosure provides an improvement in network security when there is a need to heighten the confidentiality and security of a network connection when using the domain name system. The network security is achieved without lowering the availability of the network connections. In other words, the enhancement in the confidentiality and security of the network connection are achieved by ensuring the availability of the network connection when using the domain name system, and by connecting the DNS secure resolution protocol upon fulfillment of the condition for connecting a DNS secure resolution protocol. It should be mentioned that the enhancing of the confidentiality and security of the connection is assured by connecting a DNS secure resolution protocol, in which a verification is made for the integrity of the data being transmitted, and the sending of queries and responses occurs on an encrypted communications channel. In contrast, the transmission using the DNS protocol does not guarantee the confidentiality and security of the connection, and consequently does not guarantee the confidentiality and security of the data being sent and received. Furthermore, while using the method of the present disclosure, availability of the network connection is assured in that the connecting of the mentioned DNS secure resolution protocol is done upon fulfilling the condition for connecting the DNS secure resolution protocol—that is, the availability of the network connection will not be worse than when using the DNS protocol, and in some cases it will be better (for example, when the IP address cannot be resolved from the domain name by the DNS protocol, yet it can be resolved by the DNS secure resolution protocol).

Figure 3:
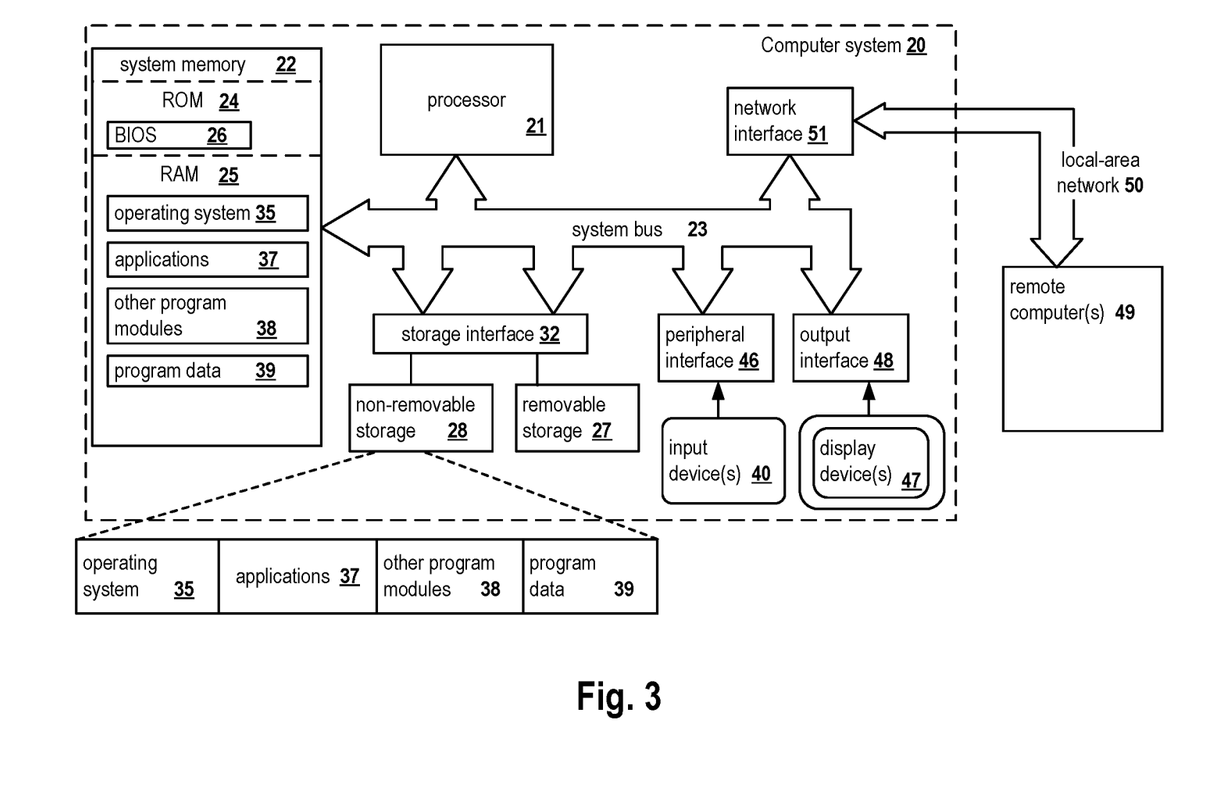
FIG. 3 presents an example of a general-purpose computer system on which aspects of the present disclosure can be implemented.

FIG. 3 is a block diagram illustrating a computer system 20 on which aspects of systems and methods for connecting a DNS secure resolution protocol in accordance with an exemplary aspect. In particular, the computer system 20 may be used to provide the functions of the computer 110, DNS resolvers 121, 131 and DNS servers 122-123 and 132-133, and the like, as described in conjunction with FIG. 1. It should be noted that the computer system 20 can correspond to a virtual machine on a computing device, for example, as described earlier, the system, comprising a processor for performing the functions of the account records generator, the determination module, the verification module, the change module, etc., may be deployed on a virtual machine. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, $I^2C$, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 3, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for connecting a Domain Name System (DNS) secure resolution protocol, the method comprising:
intercepting a DNS query from a client;
determining a fulfillment of at least one condition for connecting the DNS secure resolution protocol, wherein the at least one condition is obtained from an updatable database, and wherein the condition for connecting a DNS secure resolution protocol comprises at least one of: connecting to a public access point; obtaining access to one or more corporate resources in the computer network; obtaining access to resources from a list of protected resources; an address of a requested resource not being obtained using a DNS protocol;
connecting the DNS secure resolution protocol for the client when the at least one condition for connecting the DNS secure resolution protocol is fulfilled;
determining whether an availability of the network connection decreases after the connection of the DNS secure resolution protocol; and
connecting to a different DNS secure resolution protocol when the availability of the network connection decreases after the connection of the DNS secure resolution protocol.

2. The method of claim 1, wherein the condition for connecting a DNS secure resolution protocol comprises a lowering of a mean data transfer rate in a computer network.

3. The method of claim 2, when the fulfilled condition for connecting the DNS secure resolution protocol comprises the lowering of the mean data transfer rate in the computer network, lowering a number of DNS queries being transmitted by at least one client.

4. The method of claim 3, wherein the lowering of the number of DNS queries includes installing a single encrypted connection.

5. The method of claim 1, when the fulfilled condition for connecting the DNS secure resolution protocol comprises the connecting to the public access network, determining the connection to the public access network by:
identifying a heuristic signature of a known name of the access point; or
identifying the public access point from a list of public Service Set Identifiers (SSIDs).

6. The method of claim 1, wherein the at least one condition for connecting the DNS secure resolution protocol is modified, disabled or enabled by a remote server or by an administrator or a user of the updatable database from which the at least one condition is obtained.

7. A system for connecting a Domain Name System (DNS) secure resolution protocol, comprising:
at least one processor configured to:
intercept a DNS query from a client;
determine a fulfillment of at least one condition for connecting the DNS secure resolution protocol, wherein the at least one condition is obtained from an updatable database, and wherein the condition for connecting a DNS secure resolution protocol comprises at least one of: connecting to a public access point; obtaining access to one or more corporate resources in the computer network; obtaining access to resources from a list of protected resources; an address of a requested resource not being obtained using a DNS protocol;
connect the DNS secure resolution protocol for the client when the at least one condition for connecting the DNS secure resolution protocol is fulfilled;
determine whether an availability of the network connection decreases after the connection of the DNS secure resolution protocol; and
connect to a different DNS secure resolution protocol when the availability of the network connection decreases after the connection of the DNS secure resolution protocol.

8. The system of claim 7, wherein the condition for connecting a DNS secure resolution protocol comprises a lowering of a mean data transfer rate in a computer network.

9. The system of claim 8, when the fulfilled condition for connecting the DNS secure resolution protocol comprises the lowering of the mean data transfer rate in the computer network, the processor further being configured to lower a number of DNS queries being transmitted by at least one client.

10. The system of claim 9, wherein the configuration for lowering of the number of DNS queries includes a configuration for installing a single encrypted connection.

11. The system of claim 7, when the fulfilled condition for connecting the DNS secure resolution protocol comprises the connecting to the public access network, the processor further being configured to determine the connection to the public access network by:
- identifying a heuristic signature of a known name of the access point; or
- identifying the public access point from a list of public Service Set Identifiers (SSIDs).

12. The system according to any of claims 7, wherein the at least one condition for connecting the DNS secure resolution protocol is modified, disabled or enabled by a remote server or by an administrator or a user of the updatable database from which the at least one condition is obtained.

13. A non-transitory computer readable medium storing thereon computer executable instructions for connecting a Domain Name System (DNS) secure resolution protocol, including instructions for:
- intercepting a DNS query from a client;
- determining a fulfillment of at least one condition for connecting the DNS secure resolution protocol, wherein the at least one condition is obtained from an updatable database, and wherein the condition for connecting a DNS secure resolution protocol comprises at least one of:
- connecting to a public access point; obtaining access to one or more corporate resources in the computer network; obtaining access to resources from a list of protected resources; an address of a requested resource not being obtained using a DNS protocol;
- connecting the DNS secure resolution protocol for the client when the at least one condition for connecting the DNS secure resolution protocol is fulfilled;
- determining whether an availability of the network connection decreases after the connection of the DNS secure resolution protocol; and
- connecting to a different DNS secure resolution protocol when the availability of the network connection decreases after the connection of the DNS secure resolution protocol.

14. The non-transitory computer readable medium of claim 13, wherein the condition for connecting a DNS secure resolution protocol comprises a lowering of a mean data transfer rate in a computer network.

15. The non-transitory computer readable medium of claim 14, when the fulfilled condition for connecting the DNS secure resolution protocol comprises the lowering of the mean data transfer rate in the computer network, the instructions further including instructions for lowering a number of DNS queries being transmitted by at least one client.

16. The non-transitory computer readable medium of claim 15, wherein the lowering of the number of DNS queries includes installing a single encrypted connection.

17. The non-transitory computer readable medium of claim 13, when the fulfilled condition for connecting the DNS secure resolution protocol comprises the connecting to the public access network, the instructions further including instructions for determining the connection to the public access network by:
- identifying a heuristic signature of a known name of the access point; or
- identifying the public access point from a list of public Service Set Identifiers (SSIDs).

* * * * *